United States Patent [19]

Swift, Jr. et al.

[11] 4,295,525

[45] Oct. 20, 1981

[54] METHOD AND APPARATUS FOR QUICK REPLACEMENT OF CARTRIDGE FILTERS USED IN WELL FLUID CLEANING OPERATIONS

[75] Inventors: Edward R. Swift, Jr., Houston; Philip W. Schmuck, Spring, both of Tex.

[73] Assignee: Baker International Corporation, Orange, Calif.

[21] Appl. No.: 118,958

[22] Filed: Feb. 6, 1980

[51] Int. Cl.³ .................. B01D 27/00; B01D 27/08; B01D 29/10; E21B 43/00

[52] U.S. Cl. .................. 166/312; 166/75 R; 166/267; 166/278; 210/463; 210/323.2

[58] Field of Search ............ 210/169, 167, 232, 238, 210/323 T, 463, 496, 497 R, 499; 166/267, 266, 75 R, 312

[56] References Cited

U.S. PATENT DOCUMENTS

| | | | |
|---|---|---|---|
| 2,786,529 | 3/1957 | Parsons | 166/266 |
| 2,811,220 | 10/1957 | Winslow | 210/323 T X |
| 2,953,204 | 9/1960 | Doscher et al. | 166/266 |
| 2,960,232 | 11/1960 | Gillette | 210/169 |
| 3,149,072 | 9/1964 | Silverman | 210/232 |
| 3,317,048 | 5/1967 | Kasten | 210/323 T X |
| 3,513,980 | 5/1970 | Masaschi et al. | 210/238 |
| 3,954,618 | 5/1976 | Strauss | 210/232 |
| 3,969,248 | 7/1976 | Whitmer | 210/169 X |
| 4,052,317 | 10/1977 | Palnik | 210/323 T |
| 4,204,960 | 5/1980 | Sugiyama et al. | 210/232 |

Primary Examiner—Stephen J. Novosad
Attorney, Agent, or Firm—William C. Norvell, Jr.

[57] ABSTRACT

A cylindrical housing is adapted to receive and discharge fluid in a subterranean well. In a preferred form, a plate is positioned in the cylinder separating it into first and second chambers. Filter adapter receiving means are disposed across the plate, with a filter adapter securable therein, the adapter having a passageway extending to the chambers. The adapter has a cylindrical housing having an enlarged cartridge positioning portion. A grooveway is defined on the adapter extending exteriorly therearound for securing one end of a cartridge filter. A cartridge filter is positionable on the adapter and provides a seal having an interiorly facing circumferentially extending lip for contact with the exterior of the cylindrical housing when the filter is located on the adapter, for sealingly securing the filter to the adapter.

4 Claims, 7 Drawing Figures

METHOD AND APPARATUS FOR QUICK REPLACEMENT OF CARTRIDGE FILTERS USED IN WELL FLUID CLEANING OPERATIONS

BACKGROUND OF THE INVENTION

1. Field of the Invention

The invention relates to a method and apparatus for the quick installation and removal of a plurality of cartridge-type filter units used in a well fluid cleaning system.

2. Description of the Prior Art

In gravel packing and other operations involved during the production or workover of a subterranean well, it is desirable, for a number of reasons, to circulate through the well from the surface a fluid, which, for example, may be a carrier fluid for particulate matter, such as gravel. Such fluid may incorporate a number of additives, and may be provided in the form of a viscous jell, or the like. Regardless of the composition or use of such fluid, it is necessary that contaminants carried with the fluid during its circulation through the well be removed at the surface of the well prior to recirculation of the fluid.

Referring to FIG. 1, a conventional well cleaning system comprises a filtration unit 100 having one or more filter members, generally in series, communicating to a source fluid line 13 extending from a centrifugal pump 10, or other pump, driven by a power source 11, such as a diesel or electric engine, or the like. A dry hopper 12 may be provided along the flow line for incremental addition of fluid additives. Clean fluid is transferred from the filtration unit 100 by means of the clean fluid line 15 which extends to a clean fluid storage area 14B in a fluid storage tank 14. A source fluid storage area 14A contains dirty fluid removed from the well which is thereafter transmitted to the centrifugal pump 10 through a source fluid line 13A.

FIGS. 2A and 2B illustrate prior art and conventional cartridge assemblies. Referring specifically to FIG. 2A, a prior art cartridge apparatus A is exteriorly defined by an elongated cylindrical housing B containing therein a series of spaced filter cartridges C secured to a plate E in the housing B by means of a bolt D. Inlet line I.L. and outlet line O.L. communicating through the housing B for the transmission of the fluid. Now referring to FIG. 2B, illustrating in longitudinal crosssection a typical filter cartridge C, the bolt D is inserted through a bore G in the washer F on the top of the filter cartridge C and is secured by threads H to an elongate tube J interiorly housed within the filter cartridge C. The tube J has a number of circumferentially extending and longitudinally spaced flow passages I communicating with the annular area defined by the interior of the filter cartridge C and the exterior of the tube J for transmission of cleaned fluid passing through the filter cartridge C, into the flow passage I, thence inwardly within the tube J and through the open end M communicating to the lowermost portion of the cylindrical housing B below the plate E, for subsequent recirculation into the well bore. The tube J is affixed to a cartridge receiving bore (not shown) in the plate E by means of threads L. An orienting shoulder K circumferentially extends around the lowermost end of the tube J and above the threads L and is defined above an outwardly extending lip N which receives the lowermost end of the filter cartridge C thereon. Thus, the filter cartridge C may be located on the lip N and exterior of, or upon, the orienting shoulder K.

When the filter cartridge assembly as depicted in FIGS. 2A and 2B is utilized, it is necessary to first disengage the bolt D from the tube J and thereafter lift the filter cartridge C upwardly over the uppermost end of the tube J. This must be repeated for each filter cartridge assembly contained within the apparatus A. The inconvenience factor of this approach will be readily appreciated when one considers that this series of steps must be repeated for each filter cylinder A utilized in series, such as the series illustrated for the filtration unit 100 in FIG. 1. Such a procedure is extremely costly and time consuming.

The present invention provides a method and apparatus which completely overcomes the disadvantages of the use of typical prior art apparatuses, as shown in FIGS. 2A and 2B.

SUMMARY OF THE INVENTION

This invention is directed to an apparatus and method for treating and removing contaminate particulate matter from fluids, such as gravel packing carrier fluids, which are circulatable into, through and out of a subterranean well. The treating apparatus comprising a cylindrical housing which is adapted to receive and discharge the fluid. Means are disposed across the cylinder for separating the cylinder into a first fluid chamber which receives fluid to be filtered and a second fluid chamber which receives the filtered fluid which is subsequently transmitted for circulation or recirculation into the well. At least one cartridge filter adapter receiving means is disposed through the separating means. A cartridge filter adapter is secured within each of the receiving means, with the adapter having an elongated cylindrical housing with a fluid flow passageway extending therethrough and communicable to the first and second fluid chambers. The elongated cylindrical housing defines an enlarged cartridge positioning portion thereon extending radially away from and about the axis of the cylindrical housing. A grooveway is provided on the adapter which is circumferentially extended around the exterior of the elongated cylindrical housing and immediate one end thereof for sealingly securing one end of the cartridge filter. A cartridge filter is positionable on the adapter and extends within the first fluid chamber. Seal means are disposed at one end of the cartridge filter having an interiorly facing circumferentially extending flexible lip element for contact with the exterior of the elongated cylindrical housing upon location of the cartridge filter on the adapter, the lip being sealingly securable within the groove.

A method of treating well fluids encompasses the steps of providing a fluid flow path into, through and out of the well, treating the fluid by incorporating the treating apparatus, described above, and, subsequently, introducing the treated and cleaned fluid into the well.

DESCRIPTION OF THE PREFERRED EMBODIMENTS

Figure 1:
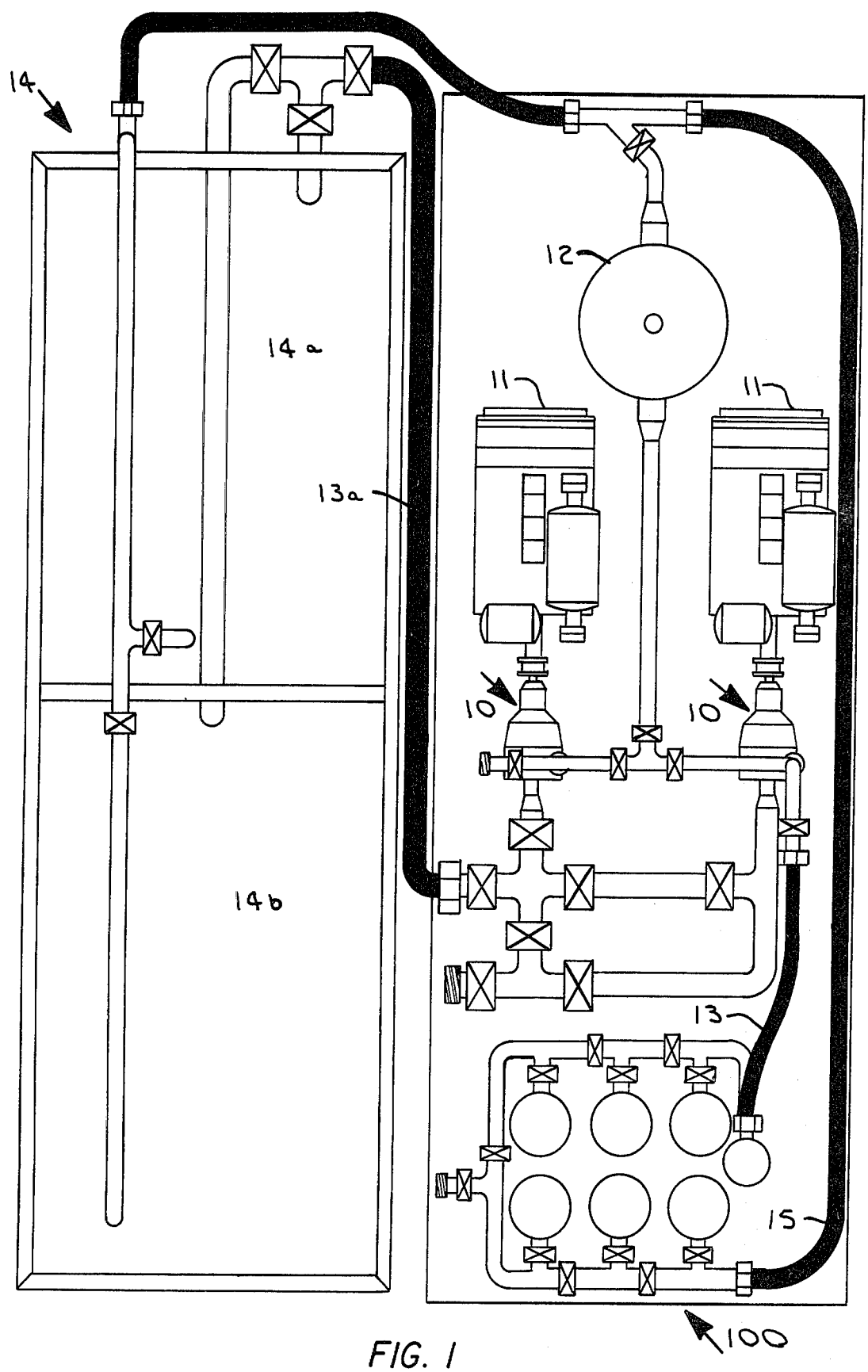
FIG. 1 is a schematic diagram of a typical fluid surface cleaning unit which may be utilized to process fluids circulated through a subterranean well.
Figure 2A:
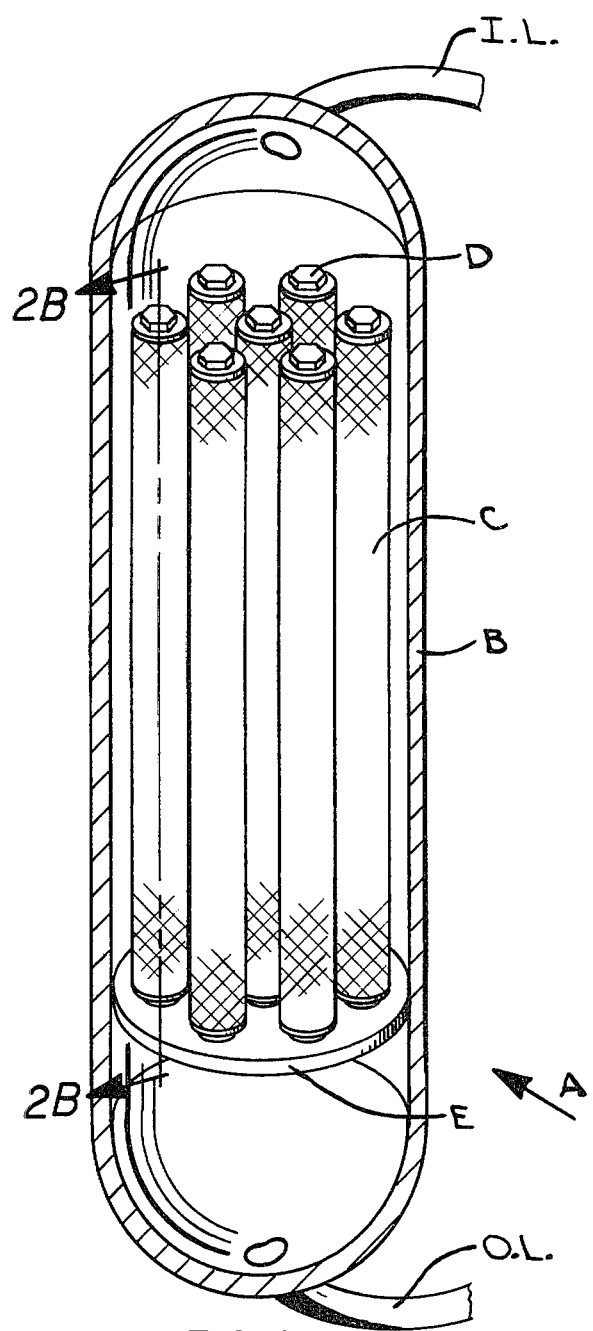
FIG. 2A is a typical prior art filter cartridge apparatus.
Figure 2B:
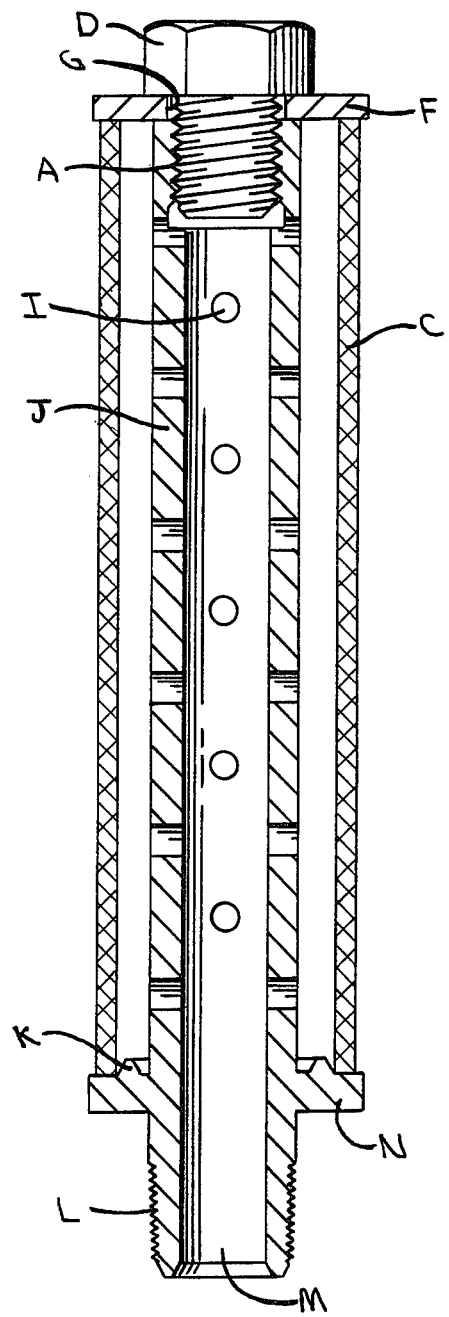
FIG. 2B is a cross-sectional view taken along line 2B—2B of FIG. 2A illustrating the construction of a prior art filter cartridge assembly.
Figure 3:
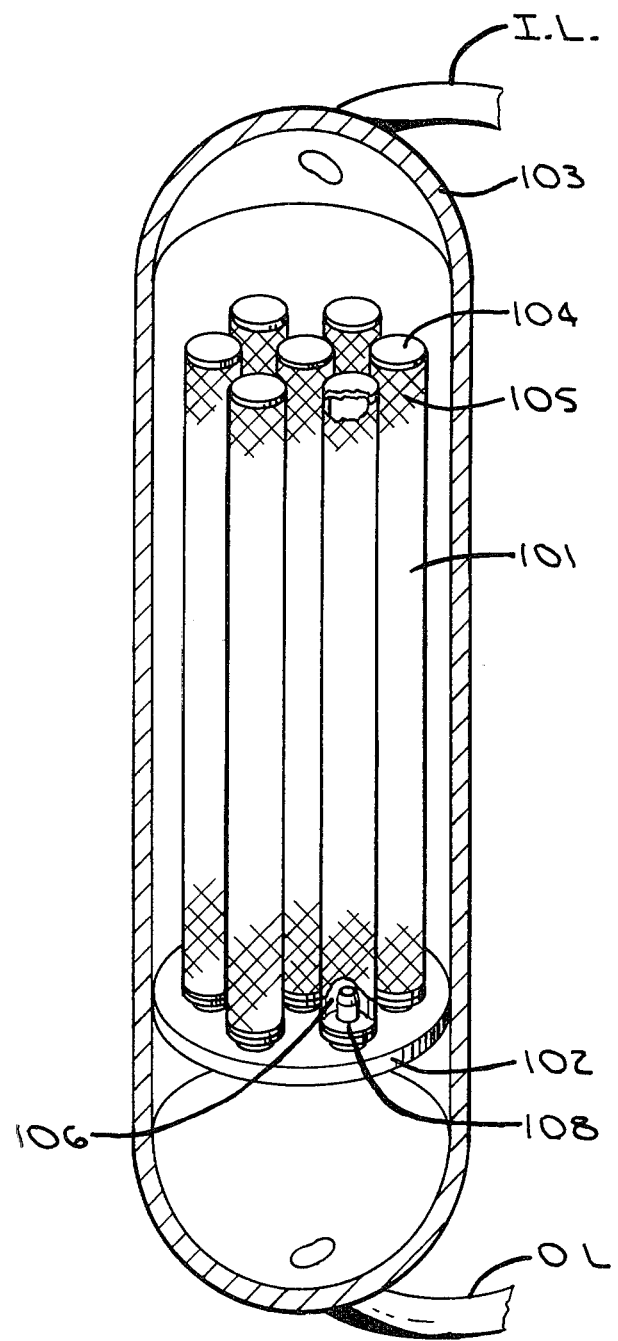
FIG. 3 is a view similar to that of FIG. 2A, illustrating the improved filter cartridge assembly of the present invention.
Figure 4:
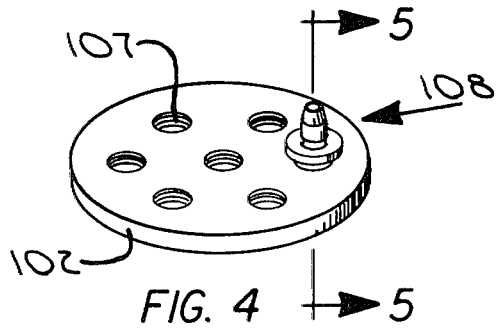
FIG. 4 is a view of the cartridge receiving plate of a cartridge cylinder with the engaging nipple of the present invention secured through a threaded bore thereon.

Now referring to FIG. 3, the cartridge assembly of the present invention is shown within a cylindrical housing 103 which may be the same as, or similar to, the cylindrical housing B of any prior art filter assembly, such as that shown in FIG. 2A. Inlet line I.L. and outlet line O.L. extend through the housing B for transmission of the subject fluid. The housing 103 has a hinged or threaded top member which is removable for insertion and retrieval of the filter cartridge assembly. A cartridge receiving plate 102 is positioned interiorly of the housing 103 and has a series of spaced, circumferentially extending threaded bores 107 thereon (FIG. 4). Each bore 107 will receive a cartridge engaging nipple 108 (FIG. 4). The cartridge 101 typically is comprised of a meshed exterior 105 of known construction, and has a sealed top end 104, to prevent fluid communication between the top of the cartridge 101 and the interior flow passageway 106 therethrough.

Figure 6:
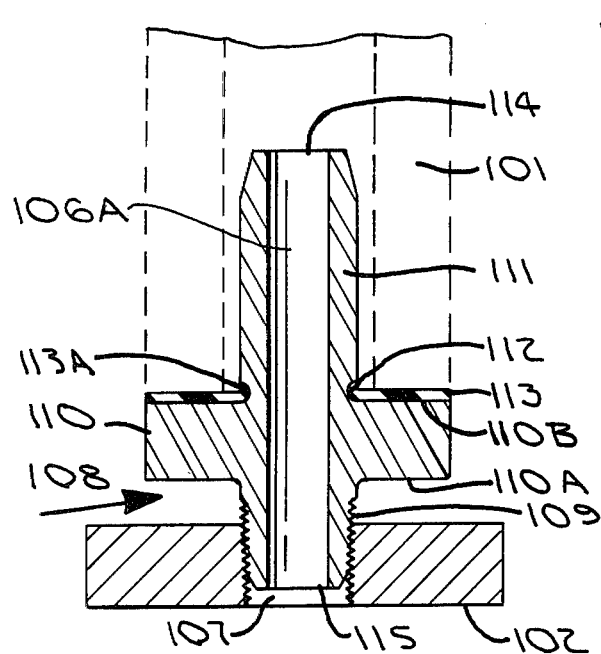
FIG. 6 is a view similar to that shown in FIG. 5, showing the complete engagement of the cartridge onto the plate.
Figure 5:
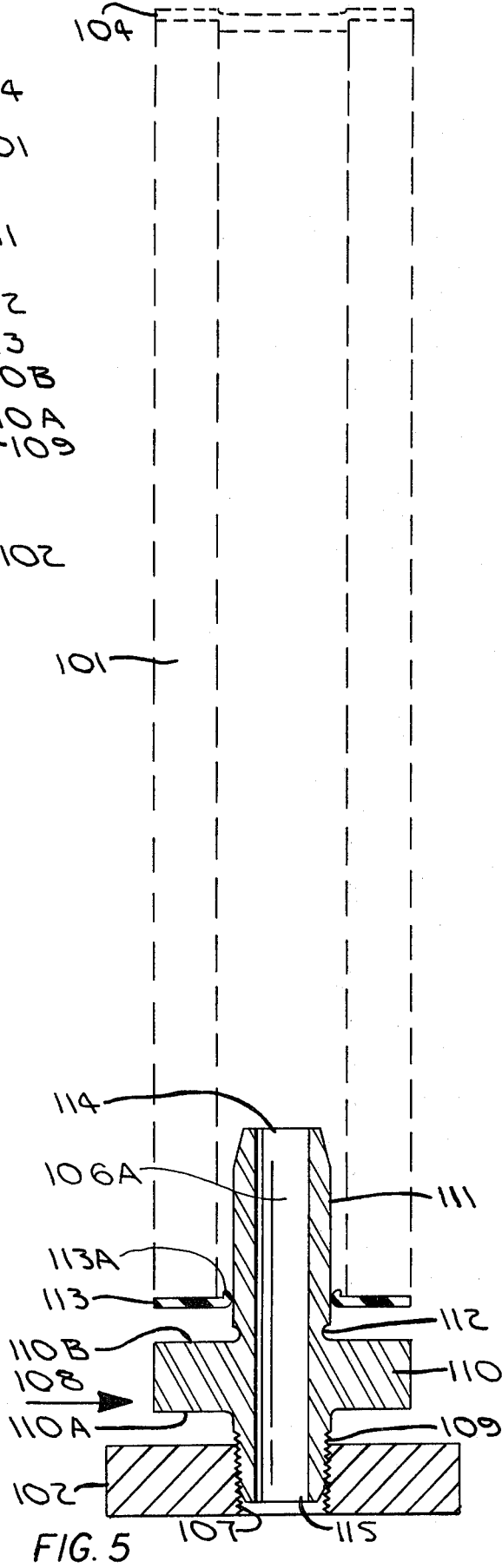
FIG. 5 is a cross-sectional view of the engaging nipple of the present invention taken along line 5—5 of FIG. 4.

Now referring to FIGS. 4, 5, and 6, each threaded bore 107 in the plate 102 will receive an engaging nipple 108 prior to insertion of the cartridges 101 within the cylindrical housing 103. Each engaging nipple, as illustrated in FIG. 5 is secured to the plate 102 through the bore 107 by means of threads 109. The nipple 108 has a cylindrically extending open ended interior 106A having its open upper end 114 communicating to the interior flow passageway 106 of the cartridge 101, when the cartridge is affixed on the nipple 108, as described below. The lower end 115 of the nipple 108 communicates to the interior of the cylindrical housing 103 below the plate 102 for transmission of clean fluids therefrom.

The engaging nipple 108 has an enlarged circumferentially extending arrester 110 protruding outwardly away from an upwardly extending guide section 111. The arrester 110 has a lower face 110A which is directed toward the plate 102 when the engaging nipple 108 is secured within the threaded bore 107. Additionally, and more importantly, the arrester 110 has an upper face 110B which serves as a down stop for receipt of the lowermost end of the cartridge 101 when it is selectively received onto the engaging nipple 108. Typically the diameter across the arrester 110 will be the same as the diameter across the cartridge 101 received thereon, but may be of a smaller or greater diameter than that of the cartridge 101.

The guide 111 of the nipple 108 extends upwardly from the arrester 110 and will be received within the lowermost end of the cartridge 101 as it is inserted over the engaging nipple 108 for affixation to the plate 102. A securing groove 112 is profiled around the lowermost exterior of the guide 111 and on the upper face 110B, somewhat, of the arrester 110. This securing groove 112 functions to "lock" the cartridge 101 in place as it is affixed onto the nipple 108. Additionally, the groove 112 also provides a means for assuring a positive seal between the nipple 108 and the lowermost end of the cartridge 101, to prevent dirty fluids from flowing within the interior flow passageway 106.

The lowermost end of the cartridge 101 has affixed to it by means of epoxy glue, or other sealant, a flexible seal member 113, which may be made of a plastic, a vinyl, polyurathane, or other flexing material. The seal 113 has an interiorly protruding flexible lip 113A which, when the cartridge 101 is desired to be affixed upon the engaging nipple 108, rides over the guide 111, flexing outwardly somewhat, to permit the lip 113A to wipe the exterior surface of the guide 111 as the cartridge 101 is being secured to the nipple 108. The lip 113 is costructed such that it will be smoothly and contourly received within the securing groove 112 upon complete affixation of the cartridge 101 onto the engaging nipple 108, as shown in FIG. 6.

OPERATION

When it is desired to replace one or more cartridges 101 within one or more cylindrical housings 103, the top of the cylindrical housing 103 is removed by conventional means. An operator's hand simply may grasp the upper exterior of the cartridge 101, somewhat below the upper sealed top 104, to pull the cartridge 101 upwardly away from the engaging nipple 108. As the cartridge 101 is urged away from the nipple 108, the flexible lip 113A will become disengaged from the securing groove 112 and ride upwardly along the guide 111, until the lowermost end of the cartridge 101 passes above the open end 114 of the guide 111. A second, clean filter cartridge 101, of the same construction as the original cartridge 101, now may be quickly placed into the cylindrical housing 103 by aligning it above the selected engaging nipple 108 on the plate 102, and, by use of an operator's hand, simply lowering the cartridge 101 over the guide 111, to permit the flexible lip 113A to ride downwardly on the guide 111, until such time as the lip 113A is sealingly secured within the securing groove 112 and the seal 113 effectively abuts the upper face 110B of the arrester 110.

This cycle may be repeated for additional cartridges and additional cylinders. Of course, all cartridges may be removed prior to replacement with new cartridges, or, one cartridge may be removed and replaced, and this cycle repeated for each cartridge.

Although the invention has been described in terms of specified embodiments which has been set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In an apparatus for treating and removing contaminate particulate matter from fluid circulatable into, through and out of a subterranean well, the improvement comprising: a cylindrical housing adapted to receive and discharge said fluid; means disposed across said cylindrical housing for separating said cylindrical housing into a first fluid chamber for receiving fluid to be filtered and a second fluid chamber for receiving filtered fluid; at least one cartridge filter adapter receiving means disposed through said separating means; a cartridge filter adapter secured within each of said receiving means, said adapter having an elongated cylindrical housing, and having a fluid flow passageway therethrough communicable to each of said first and second fluid chambers, said elongated cylindrical housing having an enlarged cartridge positioning portion extending radially away from and about the axis of said elongated cylindrical housing, said cartridge positioning portion having first and second faces thereon; groove means on said adapter circumferentially extending around the exterior of said elongated cylindrical housing for sealingly securing one end of said cartridge filter thereon; cartridge filter means positionable on said adapter and extending within said first fluid chamber; and seal means disposed at one end of said cartridge filter and having an interiorly facing circumferentially extending flexible lip for contact with the exterior of said elongated cylindrical housing upon location of said cartridge filter on said adapter, said lip being sealingly securable within said groove.

2. In an apparatus for treating and removing contaminate particulate matter from fluid circulatable into, through and out of a subterranean well, said apparatus comprising: a cylindrical housing adapted to receive and discharge said fluid; means disposed across said cylindrical housing for separating said cylindrical housing into a first fluid chamber for receiving fluid to be filtered and a second fluid chamber for receiving filtered fluid; and at least one cartridge filter adapter receiving means disposed through said separating means, the improvement comprising: a cartridge filter adapter securable within said receiving means, said adapter having an elongated cylindrical housing and having a fluid flow passageway therethrough communicable to each of said first and second fluid chambers, said elongated cylindrical housing having an enlarged cartridge positioning portion extending radially away from and about the axis of said elongated cylindrical housing, said cartridge positioning portion having first and second faces thereon; and groove means on said adapter circumferentially extending around the exterior of said elongated cylindrical housing for sealingly securing one end of said cartridge filter thereon.

3. In an apparatus for treating and removing contaminate particulate matter from fluid circulatable into, through and out of a subterranean well, said apparatus comprising: a cylindrical housing adapted to receive and discharge said fluid; means disposed across said cylindrical housing for separating said cylindrical housing into a first fluid chamber for receiving fluid to be filtered and a second fluid chamber for receiving filtered fluid; at least one cartridge filter adapter receiving means disposed through said separating means; a cartridge filter adapter secured within each of said receiving means, said adapter having an elongated cylindrical housing and having a fluid flow passageway therethrough communicable to each of said first and second fluid chambers, said elongated cylindrical housing having an enlarged cartridge positioning portion extending radially away from and about the axis of said elongated cylindrical housing, said cartridge positioning portion having first and second faces thereon; groove means on said adapter circumferentially extending around the exterior of said elongated cylindrical housing for sealingly securing one end of said cartridge filter thereon, the improvement comprising: cartridge filter means positionable on said adapter and extending within said first fluid chamber; and seal means disposed at one end of said cartridge filter and having an interiorly facing circumferentially extending flexible lip for contact with the exterior of said elongated cylindrical housing upon location of said cartridge filter on said adapter, said lip being sealingly securable within said groove.

4. A method for treating and removing contaminate particulate matter from fluid circulatable into, through and out of a subterranean well, comprising the steps of: (1) establishing a fluid flow path into, through and out of said well; (2) circulating fluid in said flow path; (3) introducing said circulated fluid into at least one filtering vessel, said vessel comprising: a cylindrical housing adapted to receive and discharge said fluid; means disposed across said vessel for separating said vessel into a first fluid chamber for receiving fluid to be filtered from said well and a second fluid chamber for receiving filtered fluid for subsequent circulation into said well; at least one cartridge filter adapter receiving means disposed through said separating means; a cartridge filter adapter secured within each of said receiving means, said adapter having an elongated cylindrical housing and having a fluid flow passageway therethrough communicable to each of said first and second fluid chambers, said elongated cylindrical housing having an enlarged cartridge positioning portion extending radially away from and about the axis of said elongated cylindrical housing, said cartridge positioning portion having first and second faces thereon; groove means on said adapter circumferentially extending around the exterior of said elongated cylindrical housing for sealingly securing one end of said cartridge filter thereon; cartridge filter means positionable on said adapter and extending within said first fluid chamber; and seal means disposed at one end of said cartridge filter and having an interiorly facing circumferentially extending flexible lip for contact with the exterior of said elongated cylindrical housing upon location of said cartridge filter on said adapter, said lip being sealingly securable within said groove; and (4) circulating into said well fluid discharged from said second chamber of said vessel.

* * * * *